United States Patent [19]

Oglesbee

[11] Patent Number: 5,724,236
[45] Date of Patent: Mar. 3, 1998

[54] POWER CONVERTER TRANSFORMER HAVING AN AUXILLIARY WINDING AND ELECTROSTATIC SHIELD TO SUPPRESS NOISE

[75] Inventor: John W. Oglesbee, Athens, Ga.

[73] Assignee: Motorola, Inc., Schaumburg, Ill.

[21] Appl. No.: 611,234

[22] Filed: Mar. 5, 1996

[51] Int. Cl.$^6$ .................................................. H02M 1/12
[52] U.S. Cl. ............................ 363/40; 363/20; 363/131
[58] Field of Search .......................... 363/20, 21, 39, 363/400, 41, 131

[56] References Cited

U.S. PATENT DOCUMENTS

| | | | |
|---|---|---|---|
| 1,837,245 | 12/1931 | Wheeler | 307/95 |
| 3,286,153 | 11/1966 | Inose | 363/133 |
| 3,465,232 | 9/1969 | Weber | 363/126 |
| 3,582,754 | 6/1971 | Hoffmann | 363/18 |
| 3,963,975 | 6/1976 | Gauper et al. | 363/15 |
| 4,089,049 | 5/1978 | Suzuki et al. | 363/39 |
| 4,443,839 | 4/1984 | Onodera et al. | 363/20 |
| 4,484,171 | 11/1984 | McLoughlin | 336/84 R |
| 4,507,721 | 3/1985 | Yamano et al. | 363/40 |
| 4,977,301 | 12/1990 | Maehara et al. | 336/84 C |
| 5,107,411 | 4/1992 | Misdom | 363/40 |
| 5,430,638 | 7/1995 | Oikawa | 363/98 |
| 5,448,465 | 9/1995 | Yoshida | 363/15 |

*Primary Examiner*—Jeffrey L. Sterrett
*Attorney, Agent, or Firm*—Scott M. Garrett; Kenneth M. Massaroni; Kelly A. Gardner

[57] ABSTRACT

A reduced noise power converter is provided with a transformer having primary, secondary, and auxiliary windings (22, 24, and 46). An electrostatic shield (26) having a shield termination (32) is disposed between the primary and secondary windings. The auxiliary winding has the opposite polarity of the primary winding, and is coupled between the shield termination and the input voltage source (12). By appropriate selection of the number of turns of the auxiliary winding, noise coupled from the primary side to the secondary side through the stray device capacitance (34) is neutralized.

14 Claims, 5 Drawing Sheets

POWER CONVERTER TRANSFORMER HAVING AN AUXILLIARY WINDING AND ELECTROSTATIC SHIELD TO SUPPRESS NOISE

TECHNICAL FIELD

This invention relates in general to power converters, and in particular to circuits for reducing noise coupled between the primary and secondary sides of a power converter having transformer isolation.

BACKGROUND

Switched mode power converters are used in numerous applications such as personal computers and battery chargers, for example. Switched mode, or switching power converters as they are commonly referred to, have an advantage over linear power supplies in that they are much more efficient at converting power. Further, they have the advantage of being able to step-up DC voltage from a low DC level to a higher DC level, which linear type supplies are unable to do. However, certain considerations must be made when designing a switching power converter.

One of the most time consuming aspects of designing a switching power converter is noise reduction. Since current is switched on and off, the voltage wave forms produced across switching power converter transformers have high slew rates. This provides for a signal with high harmonic content which produces a significant amount of noise. That is, the harmonics of the switching frequency contain a significant amount of energy. Most switching converters operate at frequencies in the range of 25 KHz–500 KHz. At lower switching frequencies the harmonics may fall in every channel of certain radio communications systems. For example, at a 25 KHz switching frequency, harmonics will be generated at 50 KHz, 75 KHz, 100 KHz, etc. Higher harmonics will be evident in each channel of the commercial FM radio band and will reduce the ability of a nearby radio receiver to receive transmitted signals.

Accordingly, the noise produced by such converters is governed by regulatory agencies to reduce interference with communications and other sensitive electrical systems. However, the levels to which noise is restricted is still far above optimum compatibility levels under certain conditions. For example, a hand held two-way radio sitting in a battery charger that contains a switching converter can experience a substantial degradation of receiver sensitivity because of the switching harmonics, despite the fact that the battery charger operates in full compliance with the applicable regulatory criteria.

Switching noise escapes either by conduction, radiation, or more likely, both. Conducted noise generally refers to the noise conducted out of the converter into the electrical service supplying the converter. However, it can also be conducted to the primary device it is powering, as well as secondary devices connected to the primary device. Typical noise reduction techniques include proper circuit board layout, and capacitive and inductive filters on the input of the converter. These techniques are well known, and upon sufficient application of these techniques, noise can be reduced to levels where it is not a concern.

Referring now to FIG. 1, there is illustrated therein a circuit diagram of a prior art switching power converter 10. The converter illustrated here is a flyback converter which is most commonly used in 1–100 watt power supplies because of its low cost, although any unbalanced, or non-symmetric converter will generate noise as described herein. The converter 10 has an input voltage source 12, a transformer 14, a switch 16, and an output 18. The output 18 is typically conditioned and may be regulated, and power is fed to a device, such as a portable radio 20, as a DC voltage obtained by use of rectifier 42 and bulk filter capacitor 40. In actuality, the power is fed to a battery the portable radio uses, but for clarity it can be assumed that the battery appears as a short circuit to high frequency noise, and the noise is coupled directly to the device.

The transformer has a primary winding 22, a secondary winding 24, and an electrostatic shield 26 disposed between the windings. The shield is a conductive element which helps reduce stray capacitive coupling between the windings, and is often used to reduce capacitive noise coupling. There will be a stray primary-shield capacitance 28, and a stray secondary-shield capacitance 30 formed when an electrostatic shield is used. These stray capacitances are not actual components, but represent the lumped sum equivalent of the capacitive effects, and are therefore illustrated in phantom. In addition, there will be a stray input capacitance 31, also illustrated in phantom, which couples the primary side of the converter to ground, the result of safety grounding and stray power cord capacitance. The stray input capacitance is usually large, and acts as a shunt at higher frequencies. The shield has a termination 32 which is grounded to help reduce coupling between the windings. This is a conventional approach to reducing noise in switching power converters, and results in a typical reduction of up to 20 decibels of power (dB) compared to similar converters without an electrostatic shield between the primary and secondary windings. Of course, the effectiveness of the actual reduction depends on the particular circuit parameters of a given converter.

In addition to the stray capacitances in the transformer, there is also a significant stray device capacitance 34, illustrated in phantom, which couples the primary and secondary sides. Noise is transmitted through the stray capacitances and can enter the device 20. Further, there can be significant radiation from the circuit board traces and other wiring since the noise is essentially electrostatic, and not the result of currents which may be eliminated by proper circuit layout design. Radiation from circuit traces can be a very difficult and expensive problem to solve, and is usually reduced by using a metal shield enclosure over the converter. However, the best way to control noise voltages is to not allow them to couple to the circuit board traces and circuit components. This can be done using transformers that provide very little stray capacitance, and by methods to reduce the stray device capacitance, but these solutions significantly increase the cost of the converter, and will typically add to the size of the converter.

Therefore, there is a need in a switching power converter for a means by which the coupling of noise can be reduced without incurring additional cost, or increasing the size of the converter.

DETAILED DESCRIPTION OF THE PREFERRED EMBODIMENT

Figure 1:
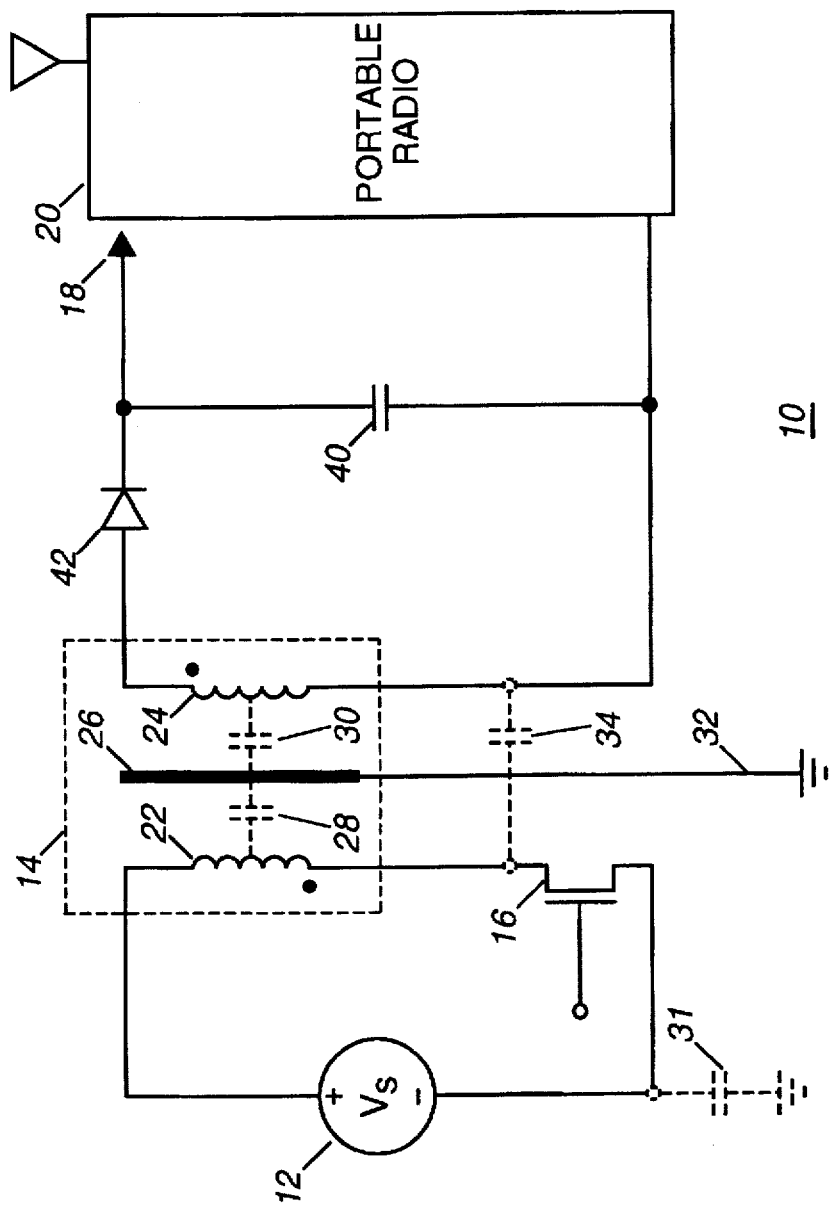
FIG. 1 is a circuit diagram in accordance with a prior art switching power converter.

While the specification concludes with claims defining the features of the invention that are regarded as novel, it is believed that the invention will be better understood from a consideration of the following description in conjunction with the drawing figures, in which like reference numerals are carried forward.

Figure 2:
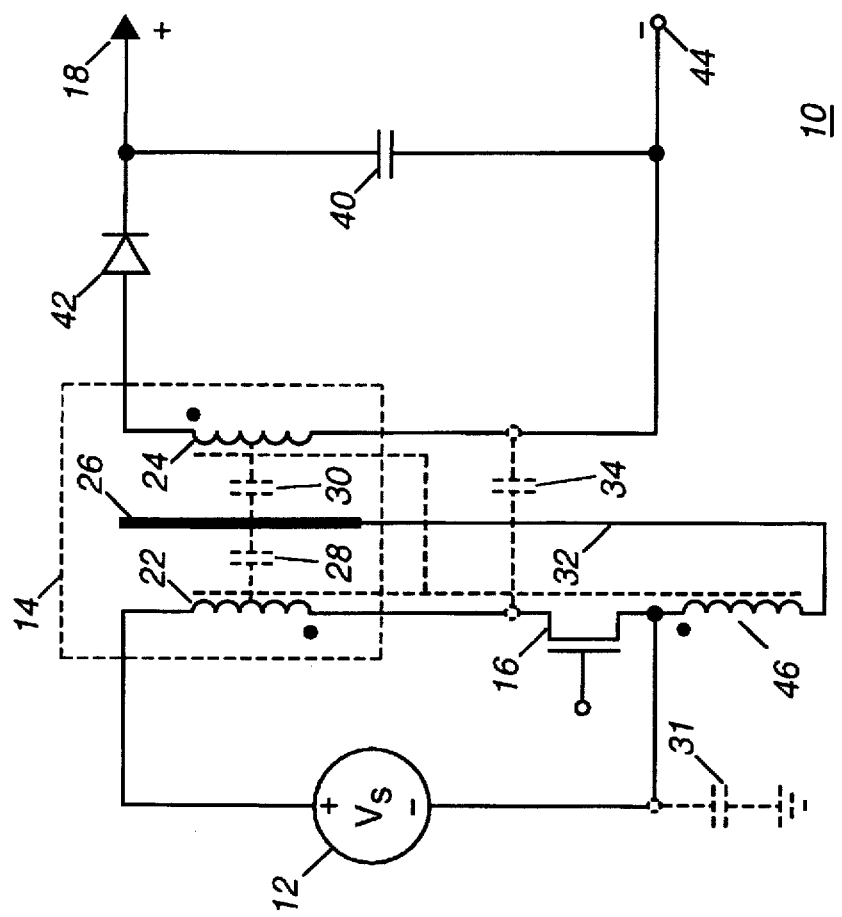
FIG. 2 is a circuit diagram of a reduced noise power converter in accordance with a first embodiment of the invention.

Referring now to FIG. 2, there is illustrated therein a circuit diagram of a reduced noise power converter in accordance with a first embodiment of the invention. The converter is similar to that shown in FIG. 1, and includes the transformer 14 with the primary winding 22, secondary winding 24, and the electrostatic shield 26 disposed between the windings. Raw power is provided by an input voltage source 12, which is typically derived from rectified AC voltage which is bulk filtered to provide a substantial DC level as is well established in the art. However, it is contemplated that the invention will also function if the rectified AC is not bulk filtered. The switch 16 is coupled in series with the primary winding 22 across the input voltage source on the primary side of the converter. On the secondary side, the secondary winding charges a capacitor 40 through a rectifier 42 to provide a DC output between positive output 18 and negative output 44. Coupling the primary side to the secondary side is a stray device capacitance 34, and the stray primary-shield capacitance 28 and stray secondary-shield capacitance 30.

Additionally, there is provided on the transformer 14 an auxiliary winding 46 which is coupled between the electrostatic shield termination 32 and the input voltage source 12, and has an opposing polarity to the polarity of said primary winding as indicated by the dots. During operation the auxiliary winding 46 causes the electrostatic shield to be at a voltage potential which has the opposite polarity of the voltage evident across the primary winding 22. When the number of turns of the auxiliary winding is properly selected, the noise coupled to the secondary side by the stray device capacitance 34 is canceled out by an equal, but opposite noise current drawn through the stray secondary-shield capacitance 30.

Figure 3:
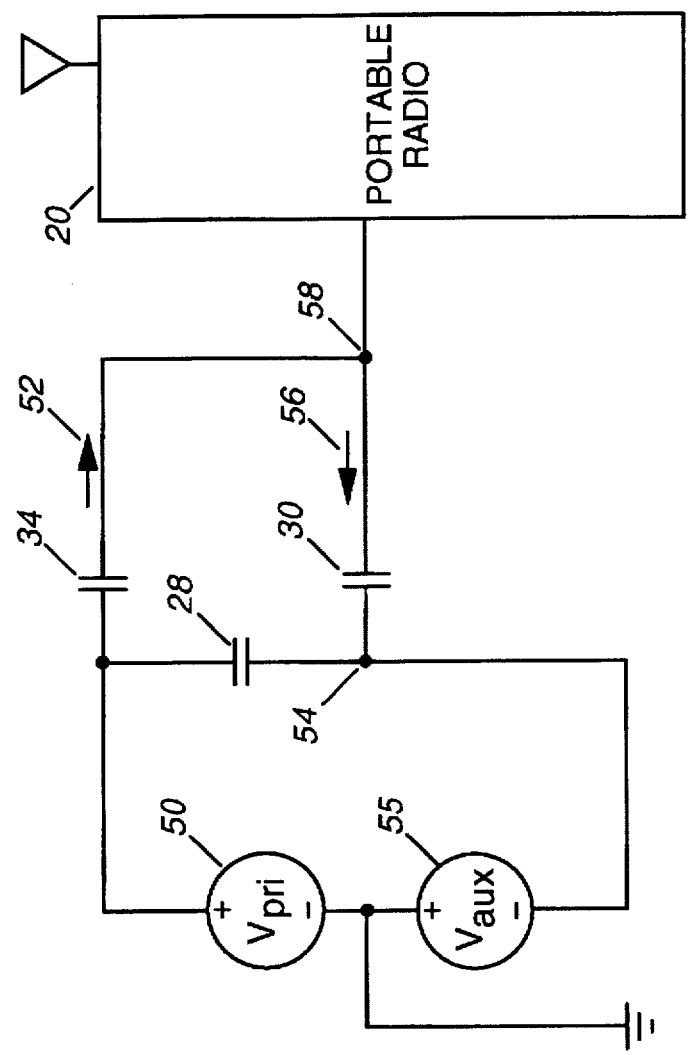
FIG. 3 is an equivalent circuit diagram showing the voltages and stray capacitances in accordance with a first embodiment of the invention.

To further illustrate how the noise reduction is achieved, a simplified circuit model is shown in FIG. 3. The stray primary-shield 28, secondary-shield 30, and device 34 capacitances are shown in a network representative of a high frequency model. Primary noise voltage 50 is generated by the voltage across the primary winding, and is essentially referenced to ground since the stray input capacitance is sufficiently large. At higher noise frequencies, the stray input capacitance can be assumed to be a short circuit. The primary noise voltage drives a first noise current 52 through the stray device capacitance 34. In the prior art converter of FIG. 1, a significant portion of this first noise current would be received by the secondary side, and the device 20. However, because the electrostatic shield, represented here by node 54, is driven by an auxiliary voltage 55 which is negative with respect to the primary noise voltage 50, and it is of sufficient magnitude that the resulting second noise current 56 driven from the secondary side through the stray secondary-shield capacitance cancels out the first noise current 52 at node 58, the noise generated by the converter is substantially reduced, if not eliminated altogether.

By properly selecting the number of turns for the auxiliary winding, cancellation is accomplished, and in many cases a shielded enclosure is no longer necessary for the converter, thus eliminating a significant cost. In addition, a substantial amount of input filtering may also be eliminated since in the prior art, converter noise is conducted to ground through the grounded shield and the stray input capacitance 31. The filtering components typically used on the power input circuits to reduce noise may be eliminated, or at least substantially reduced. For example, common mode chokes in series with the power current, and capacitors coupling the hot, neutral, and ground lines together may no longer be necessary.

Figure 4:
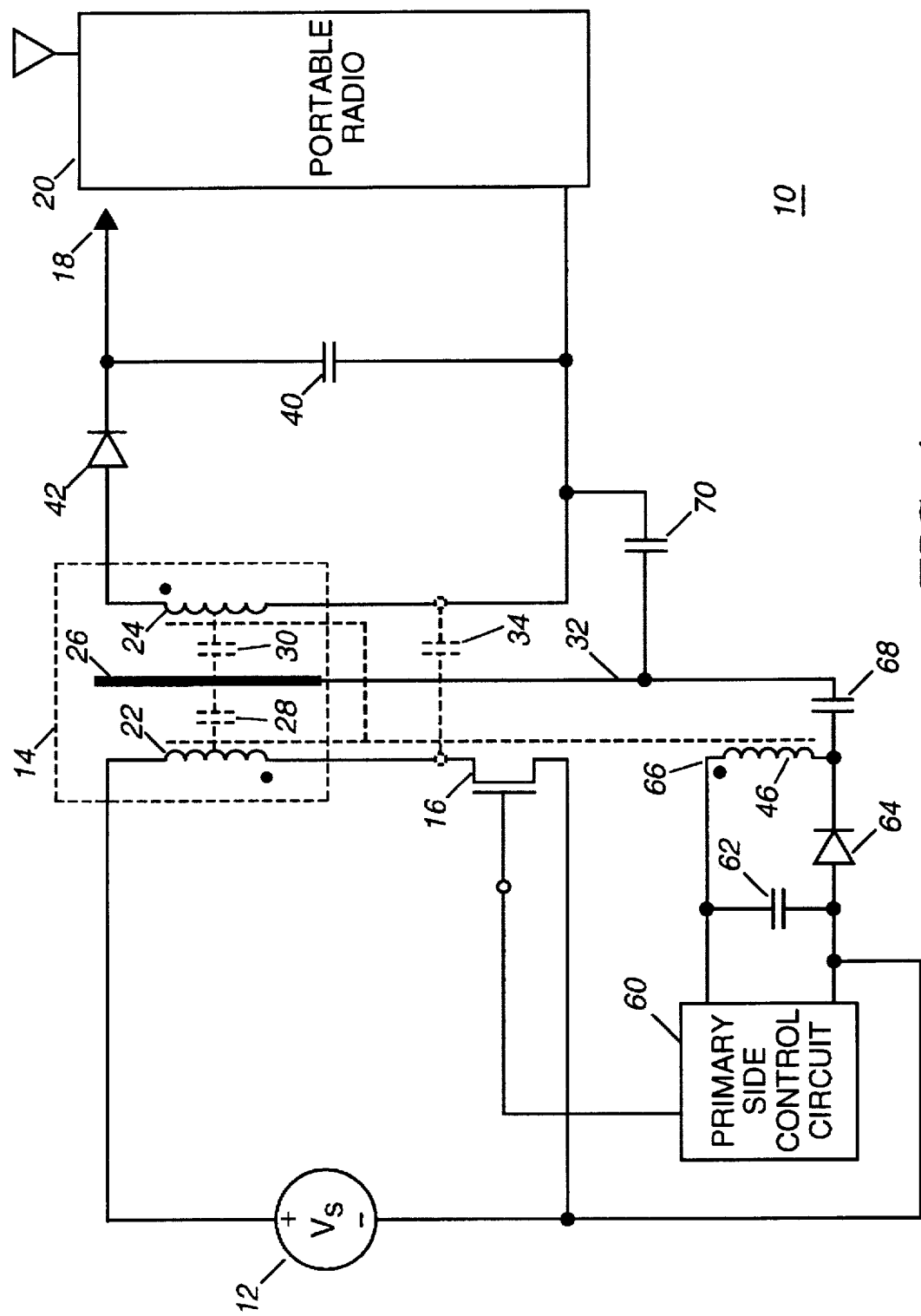
FIG. 4 is a circuit diagram of a reduced noise power converter in accordance with a second embodiment of the invention.

Most switching power converters have an auxiliary winding, as illustrated in FIG. 4. Referring now to FIG. 4, there is illustrated therein a B switching power converter in accordance with a second embodiment of the invention. As is common in switching power converters, an auxiliary winding 46 is used to power the primary side control circuit 60, which controls the switch 16. Since the circuitry used by the primary side control circuit typically operates at lower voltage than the voltage provided by the input voltage source 12, the auxiliary winding is used in conjunction with a bulk filter capacitor 62 and a rectifier 64 to generate a voltage at a more appropriate level. The specific arrangement here deviates from the conventional arrangement in that the rectifier 64 is usually placed between the positive side 66 of the auxiliary winding and the bulk filter capacitor 62 with the opposite orientation. The arrangement shown here accomplishes the same end; a substantially DC voltage is provided to the primary side control circuit.

However, the preferred voltage generated by the auxiliary winding when used to power the control circuit may not be at the appropriate magnitude to cancel noise currents according to the first embodiment of the invention. The second embodiment of the invention remedies the voltage magnitude mismatch by coupling a balancing capacitance 68 between the electrostatic shield termination 32 and the auxiliary winding 46. This has the effect of reducing the capacitance of the stray secondary-shield capacitance 30 by creating a series capacitance divider. By appropriate selection of the balancing capacitor the voltage generated by the auxiliary winding will induce sufficient noise current through the stray secondary-shield capacitance to cancel the opposite polarity noise current flowing through the stray device capacitance 34. In the unlikely event that the effective stray secondary-shield capacitance is too small for the preferred auxiliary winding, it is contemplated that an additional capacitance may be added in parallel with the stray secondary-shield capacitance by connecting a capacitor 70 between the secondary side and the shield termination. By coupling an additional capacitor in parallel, the effective capacitance is increased.

In practicing the invention one must first determine the value of the stray capacitances. This will typically be done empirically by use of capacitance measurement equipment, as is common in the art. The capacitance should be measured at high frequencies, and it is suggested that a network analyzer would be particularly suited for this measurement. After the respective stray capacitances have been determined, then the following equation must be satisfied:

$$(V_{pri})(C_{dev}) = (V_{aux})(C_{s-s})$$

Where;

$V_{pri}$ is the voltage across the primary winding in FIG. 3 referred to as primary noise voltage 50;

$V_{aux}$ is the voltage across the auxiliary winding, referred to as auxiliary voltage 55;

$C_{dev}$ is the stray device capacitance 34; and $C_{s-s}$ is the stray secondary-shield capacitance 30.

That is, the product of the magnitude of the voltage across the primary winding and the stray device capacitance must equal the product of the magnitude of the auxiliary winding and the stray secondary-shield capacitance. The primary voltage, stray device capacitance, and stray secondary-shield capacitance are fixed initially, and if the auxiliary voltage is not at an appropriate level initially, the equation may be satisfied by the addition of a balancing capacitor of appropriate value.

Figure 5:
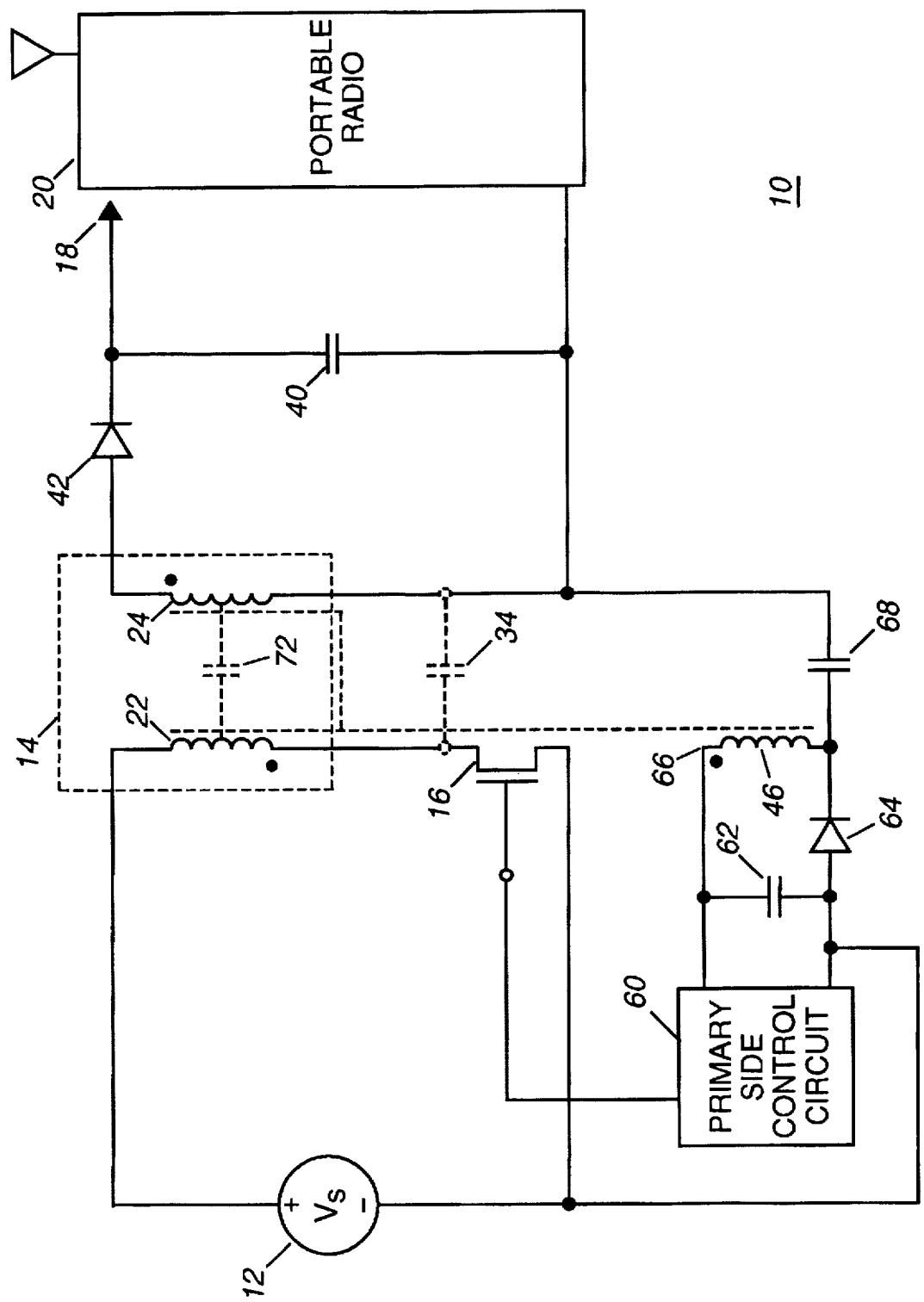
FIG. 5 is a circuit diagram of a reduced noise power converter in accordance with a third embodiment of the invention.

In the use of this equation, it is contemplated that it is not necessary for the electrostatic shield to be present to apply the concept of the invention. Referring now to FIG. 5, there is illustrated therein a power converter circuit diagram in accordance with a third embodiment of the invention. The converter is similar to that shown in FIG. 4, except that there is no electrostatic shield in the transformer. Consequently, a stray primary-secondary capacitance 72 is defined between the primary winding and the secondary winding. The stray device capacitance 34 is still present, and adds to the stray primary-secondary capacitance. Here the noise coupled into the secondary side of the converter must be canceled by the noise drawn from the auxiliary winding 46 and the balancing capacitance 70. The relationship in selecting the balancing capacitance is:

$$(V_{pri})(C_{p-s}+C_{dev})=(V_{aux})(C_{bal})$$

where;

$C_{p-s}$ is the stray primary-secondary capacitance 72;

$C_{bal}$ is the balancing capacitance 70;

$C_{dev}$ is the stray device capacitance 34; and $V_{pri}$ and $V_{aux}$ are the voltages generated by the primary and auxiliary windings, referred to as primary noise voltage 50 and auxiliary voltage 55, respectively.

Unlike the prior art attempts to reduce noise by trying to reduce the coupling paths, the present invention utilizes a means for neutralizing noise coupled to the secondary side of the converter. By generating a noise signal of opposite polarity to that produced by switching current through the primary winding, and then coupling the noise signal to the secondary side, all noise is neutralized. The noise signal is the auxiliary voltage generated by the auxiliary winding.

Although a flyback topology has been used to illustrate the invention, it is applicable to other converter topologies as well. For the invention to be effective, the converter should be an unbalanced switching power converter. That is, there are converter topologies which, in theory, produce noise canceling currents and should be inherently balanced, such as a full bridge converter, and there are topologies, such as the flyback, which are inherently unbalanced, such as the flyback converter. The flyback is unbalanced because current is only drawn in one direction through the primary winding. Balanced converters are also commonly referred to as symmetric converters in the art. However, in practice, the physical implementation of a theoretically balanced converter may result in some imbalance. For example, a push-pull converter is theoretically balanced, but it is widely known that this topology suffers from imbalance in practice because of small differences in components which should be identical, but because of manufacturing tolerances, for example, are not. In those converter topologies where the primary winding is center tapped, such as the push-pull, and half-bridge, for example, the primary winding is already divided into two portions which may act as a "primary" winding and an "auxiliary" winding for the purposes of noise cancellation. All that would be required of the designer is to characterize the stray capacitances inherent in the physical design, then couple the secondary side of the converter to the switch side of one of the windings through an appropriately sized balancing capacitance.

This suggests that a poorly constructed transformer, one which would produce high noise levels in a conventional converter, could be used with the present invention and generate virtually no noise. In light of the fact that the industry is focused on better transformer construction, better materials, and better filtering to reduce switching noise, the invention presents a simple, novel, and non-obvious means for reducing noise. Prototype units of commercial grade switching converters employing the invention have been constructed for battery chargers. By the correct configuration of the auxiliary winding, unexpected beneficial results were obtained. Noise levels were reduced by 20–30 dB over a conventionally configured, but otherwise similarly constructed unit. The prototype units did not need conventional input filtering or shielding to achieve the noise reduction. Thus, the noise levels were significantly reduced, and several costly components, such as the common mode chokes, were eliminated.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A reduced noise power converter having an input voltage source, a transformer having a primary winding; secondary winding, an auxiliary winding; and an electrostatic shield disposed between said primary winding and said secondary winding, said primary winding having a polarity, said auxiliary winding having an opposing polarity to said primary winding, and wherein said auxiliary winding is coupled between said electrostatic shield and said input voltage source.

2. A reduced noise power converter as defined by claim 1, wherein said power converter has a primary side, a secondary side, and a stray device capacitance defined between said primary side and said secondary side, a stray secondary-shield capacitance defined between said secondary winding and said electrostatic shield, a switch coupled in series with said primary winding producing a primary noise voltage on said primary side, said primary noise voltage being coupled to said secondary side through said stray device capacitance, said auxiliary winding inducing an auxiliary voltage on said electrostatic shield such that said primary noise voltage is neutralized.

3. A reduced noise power converter as defined by claim 1, further comprising a capacitor coupled between said electrostatic shield and said auxiliary winding.

4. A reduced noise power converter as defined by claim 1, wherein said auxiliary winding is used to power a primary side control circuit.

5. A reduced noise power converter as defined by claim 4, further comprising a balancing capacitor coupled between said electrostatic shield and said auxiliary winding.

6. A reduced noise power converter as defined by claim 5, wherein said power converter has a primary side, a secondary side, and a stray device capacitance defined between said primary side and said secondary side, a stray secondary-shield capacitance defined between said secondary winding and said electrostatic shield, a switch coupled in series with said primary winding producing a primary noise voltage on said primary side, said primary noise voltage being coupled to said secondary side through said stray device capacitance, said auxiliary winding inducing a voltage on said electrostatic shield through said balancing capacitor, said balancing capacitor selected such that said primary noise voltage is neutralized.

7. A reduced noise power converter having a primary side and a secondary side, comprising:

an input voltage source;

a transformer having a primary winding, secondary winding, and an auxiliary winding;

said primary winding generating a primary noise voltage, $V_{pri}$, and said auxiliary winding generating an auxiliary voltage, $V_{aux}$, having an opposite polarity from said primary noise voltage;

an electrostatic shield disposed between said primary winding and said secondary winding, and having a shield termination;

said auxiliary winding coupled between said shield termination and said input voltage source;

a stray device capacitance, $C_{dev}$, defined between said primary side and said secondary side, and a stray secondary-shield capacitance, $C_{s-s}$, defined between said secondary winding and said electrostatic shield; and wherein said auxiliary winding is selected such that the equation $$(V_{pri})(C_{dev}) = (V_{aux})(C_{s-s})$$

is satisfied.

8. A reduced noise power converter as defined by claim 7, wherein said stray secondary-shield capacitance includes a balancing capacitor.

9. A method of reducing noise in an unbalanced switching power converter comprising the steps of:

switching a current through a primary winding, thereby generating a primary noise voltage;

generating an auxiliary voltage having a polarity opposite that of said primary noise voltage; and combining said auxiliary voltage with said primary noise voltage such that said primary noise voltage is neutralized.

10. The method of claim 9 wherein said step of combining is coupling said auxiliary voltage to an electrostatic shield disposed between a primary winding and a secondary winding of a transformer.

11. The method of claim 9, wherein said step of combining is coupling said auxiliary voltage to a secondary side of said switching power converter.

12. An unbalanced switching power converter having an input voltage source, a primary side and a secondary side, a transformer having a primary winding and a secondary winding, a switch coupled in series with said primary winding which generates a primary noise voltage, said switching power converter comprising an electrostatic shield disposed between said primary winding and said secondary winding, and having a shield termination and an auxiliary winding disposed on said transformer having a polarity opposite of said primary winding coupled between said input voltage source and said shield termination for neutralizing said primary noise voltage.

13. An unbalanced switching power converter as defined by claim 12, wherein said means for neutralizing comprises:

a balancing capacitance coupled to said secondary side; and an auxiliary winding disposed on said transformer having a polarity opposite of said primary winding coupled between said input voltage source and said balancing capacitance.

14. An unbalanced switching power converter as defined by claim 12, wherein said means for neutralizing comprises:

an electrostatic shield disposed between said primary winding and said secondary winding, and having a shield termination;

a balancing capacitance coupled to said shield termination; and an auxiliary winding disposed on said transformer having a polarity opposite of said primary winding coupled between said input voltage source and said balancing capacitance.

* * * * *